UNITED STATES PATENT OFFICE.

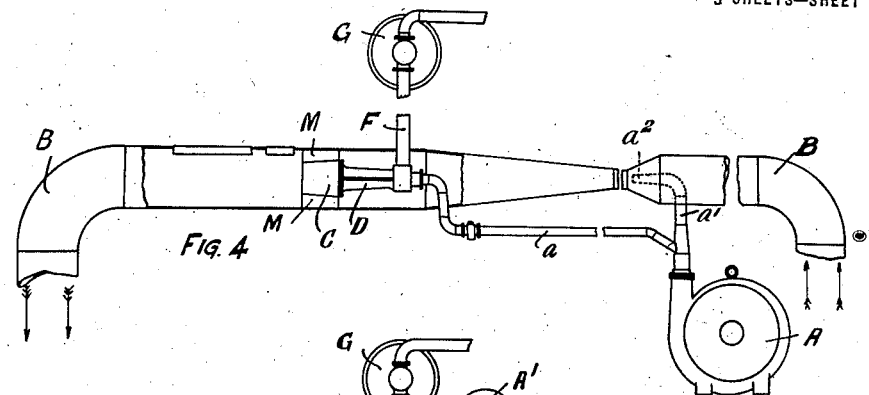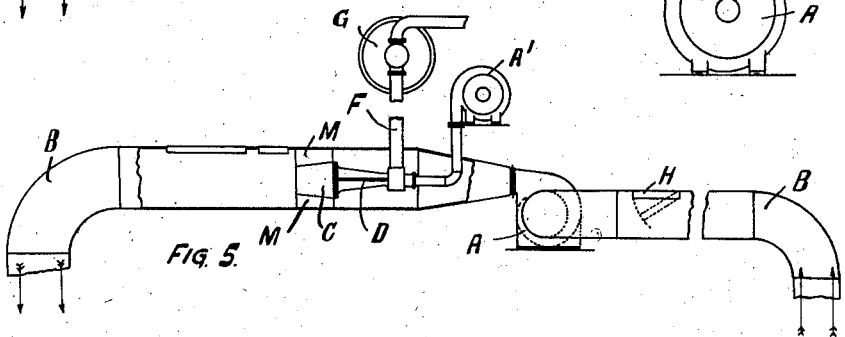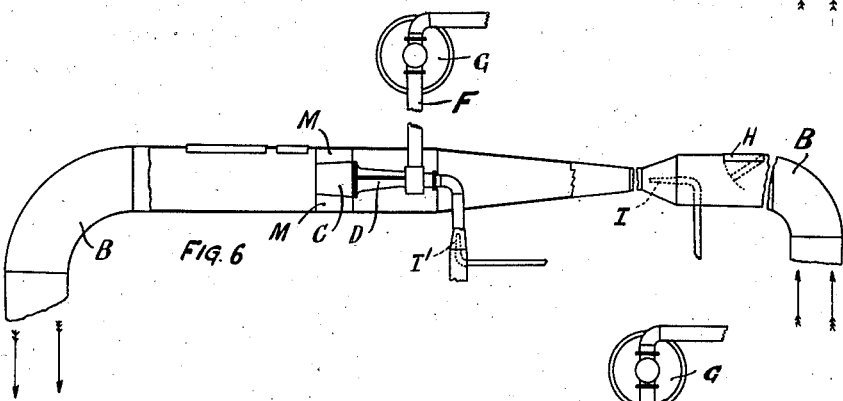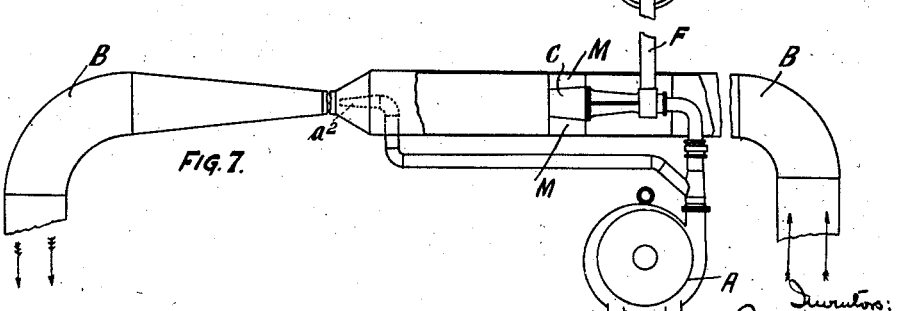

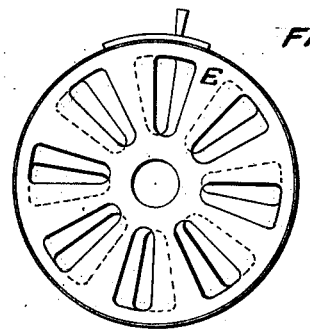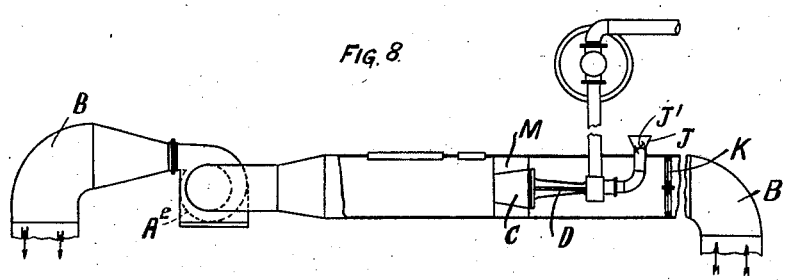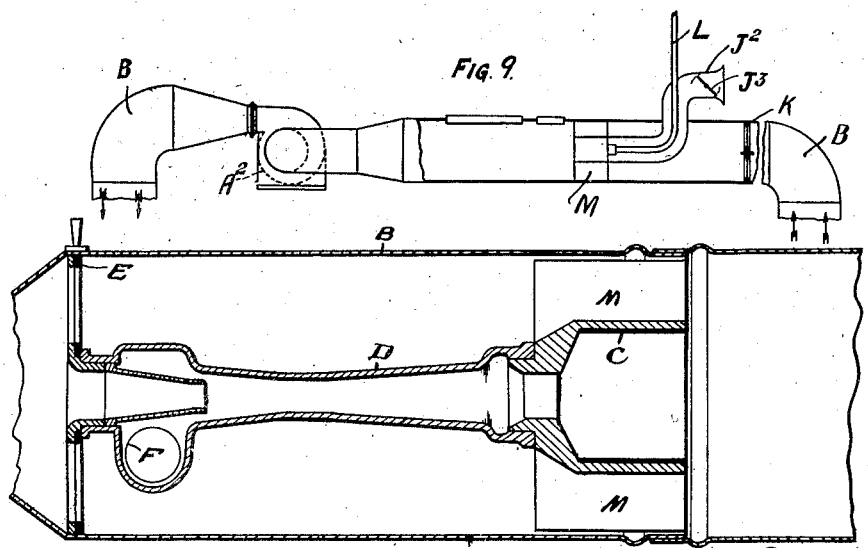

GEORGE KEITH AND DAVID BALFOUR BAIN, OF LONDON, ENGLAND.

HEATING AND DRYING APPARATUS.

1,411,729.  Specification of Letters Patent.  Patented Apr. 4, 1922.

Application filed April 18, 1921. Serial No. 462,393.

*To all whom it may concern:*

Be it known that we, GEORGE KEITH and DAVID BALFOUR BAIN, both subjects of the King of the United Kingdom of Great Britain and Ireland, and both residing at London, England, have invented a certain new and useful Improvement in Heating and Drying Apparatus, of which the following is a specification.

This invention relates to heating and drying apparatus for use inter alia in drying moulds, particularly large moulds for metal castings, for heating ovens such as baking ovens, core ovens and the like, and for other purposes.

Apparatus according to the invention includes a pipe in which is contained a gas burner to which burner are led gas and air for combustion and around which is led fresh air introduced into the pipe around which is led the partially cooled mixture from the moulds, ovens or the like being dried or heated, or the partially cooled mixture from jackets or the like surrounding the moulds, ovens or the like, which air or mixture is heated or reheated in its passage around the burner and is led admixed with the hot products of combustion to the moulds, ovens or the like, suitable provision being made, if required, for regulation of the proportion of fresh air or partially cooled mixture to hot products of combustion.

Figure 1:
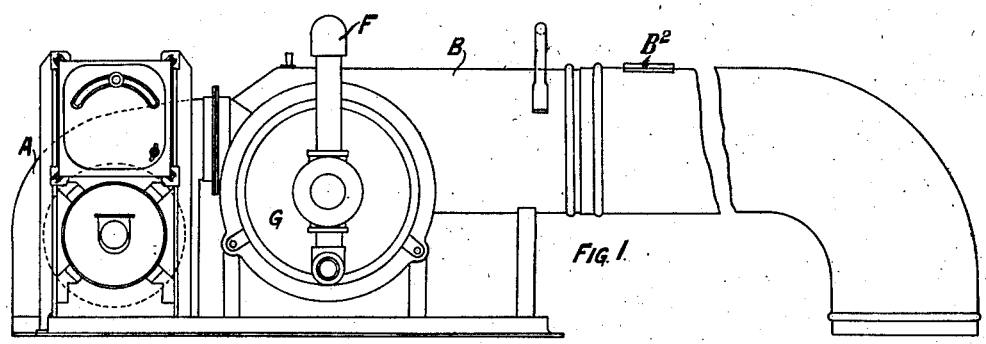
Figure 2:
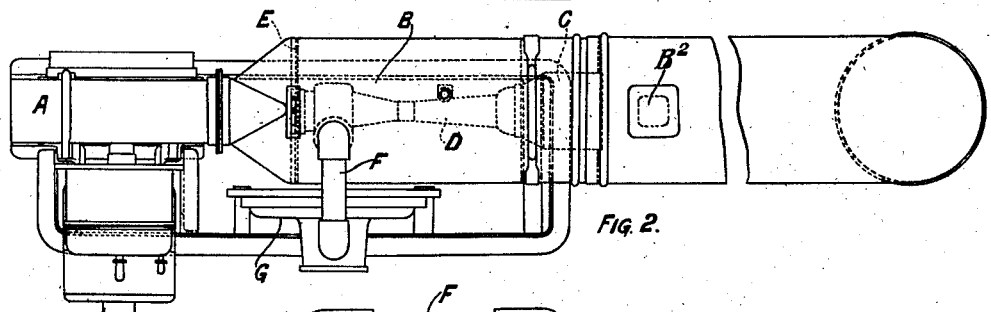
Figure 3:
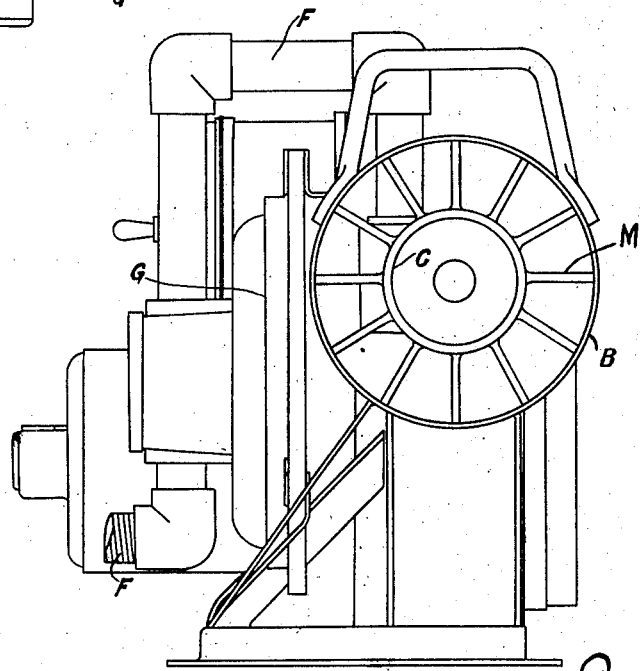

In the accompanying drawings Fig. 1 is an elevation and Fig. 2 a plan of an apparatus according to the invention. Fig. 3 is an end view with the outlet bend removed. Figs. 4 to 9 are diagrammatic and partially sectional elevations showing modifications. Fig. 10 is an elevation of the damper, and Fig. 11 a central section through the pipe B, Fig. 2.

The apparatus shown in Figs. 1, 2, 3, 10 and 11 includes a fan A, in the present instance electrically driven, a pipe B coupled to the fan casing and a gas burner C within the pipe B, a continuation of which pipe B delivers to moulds, ovens or the like air supplied by the fan and heated by the combustion of gas, and also the products of combustion.

The burner C is shown as being disposed centrally of the pipe B and is supplied by an injector D which in the particular construction illustrated is located within the pipe B. Fitted in the pipe B at the air inlet of the injector or mixer tube D is a diaphragm fitted with a rotary hit and miss damper E, the said diaphragm being so arranged that a portion of the air blast from the fan A passes into the mixer tube D, inducing the flow of gas supplied by a pipe F coupled to the mixer D, forming a self-burning mixture which burns in the burner C.

The burner C conveniently consists of a cup-like structure lined with refractory material and provided with radiating fins M extending between the cup-like structure and the inner wall of the pipe B.

Beyond the cup the pipe B is provided with an ignition door $B^2$.

In operation the gas is ignited at the burner C. A portion of the air supplied by the fan A passes to the burner C and another portion is admitted by way of the damper E to the pipe B, whence it passes over the burner C between the fins M and mixes with the products of combustion issuing from the burner C.

By variation of the proportion of air passing through the damper E the temperature of the resultant mixture can be adjusted.

In conjunction with the apparatus above described there may be employed a governor G of known construction which maintains the correct proportions of the combustible mixture passing through the mixer D irrespective of variation of the air pressure of the fan A or of the gas pressure.

To ensure safety in igniting the gas, there may be used an ignition jet of gas supplied from the same source as the governor G, which jet is lit before the main gas supply is turned on and shoots through the ignition door $B^2$, so as to effect ignition of the gas first to come along without risk of being extinguished by the blast.

In the modified construction shown in Fig. 4 the fan A is connected by a pipe connection $a$ to the mixer D. From the fan A is also led a connection $a^1$ terminating in an injector nozzle $a^2$ located in a contracted portion of the pipe B. It will be seen from consideration of the figure that air from the fan A led through the connection $a$ will induce the flow of gas through the pipe F and through the mixer D to the burner C, the gas being controlled by the governor G as in the first described construction, the air and gas being so proportioned as to constitute a self-burning mixture which is consumed in the burner C.

In addition, air from the fan A passing through the connection $a^1$ and issuing at the nozzle $a^2$ will induce partially cooled mixture returning from the moulds, ovens or the like to flow through the pipe B through the spaces between the fins M surrounding the burner C. The arrangement thus effects re-circulation of part of the mixture which has not parted with all its heat. There is thus obtained considerable economy of gas consumption, as less heat energy is required to raise the temperature of the partially cooled mixture than to heat up the same volume of fresh air from the cold, while better transmission of heat is obtained due to rapid circulation.

In the alternative arrangement shown in Fig. 5 there are employed two fans. In addition to the fan A serving to impel the mixture between the fins M surrounding the burner C there is provided an auxiliary fan A' connected to the mixer D for supplying air to the burner. At H is an inlet for admission of fresh air to the system if and when required. The construction shown in Fig. 5 offers over the construction shown in Fig. 4 the advantage that no cold medium need be introduced into the re-circulated mixture.

Fig. 6 shows a modified construction in which, in lieu of the fans A, A', of Fig. 5, there are employed two injectors I, I'. In this construction air supplied to the mixer D is induced by a high pressure jet and injector at I' and partly cooled mixture is forced between the fins M by means of the injector I. If steam be the motive power, the steam is incorporated in the hot resultant mixture as water vapour, which is an advantage for certain purposes.

Fig. 7 shows a construction similar to that of Fig. 4 but with the nozzle $a^2$ arranged beyond the burner C so as to suck the re-circulated mixture through the spaces between the fins M instead of forcing it between the fins; alternatively, a fan may be fitted in the pipe in substitution for the injector $a^2$.

Fig. 8 shows a modified construction in which an exhaust fan $A^2$ effects circulation of the mixture, sucking the heated mixture through the spaces between the fins M and at the same time sucking through the pipe J the air constituent of the gas and air mixture to be consumed in the burner C. The pipe J is fitted with a valve J' to regulate the amount of air passing. A damper K is fitted in the pipe B to permit sufficient suction to be set up in the pipe J.

Fig. 9 shows a modification in which the provision for mixing the gas with air before combustion is dispensed with and the governor is omitted. In the embodiment of the invention shown in Fig. 9 neat gas is burned from a cup at the end of the gas pipe L and sufficient air to complete the combustion of the gas is drawn in by the pipe $J^2$ fitted with a regulatable valve $J^3$. In this modification there is also provided a damper K to permit sufficient suction to be set up in the pipe $J^2$.

In the forms shown in Figs. 8 and 9 an injector such as shown in Fig. 7 may be substituted for the fan $A^2$.

We claim:—

1. Heating or drying apparatus comprising, in combination, a pipe, a burner within said pipe, said burner being formed as a cup having external fins extending between the cup walls and the inner wall of said pipe, an injector in front of said burner, a gas supply pipe coupled to said injector, and means for impelling gaseous medium through and past said injector.

2. Heating or drying apparatus comprising, in combination, a fan, a pipe coupled to said fan, a burner within said pipe, said burner being formed as a cup having external fins extending between the cup walls and the inner wall of said pipe, an injector between said fan and said burner, a gas supply pipe coupled to said injector, and means for controlling the passage of air through and past said injector.

3. Heating or drying apparatus comprising, in combination, a fan, a pipe coupled to said fan, a burner within said pipe, said burner being formed as a cup having external fins extending between the cup walls and the inner wall of said pipe, an injector between said fan and said burner, a gas supply pipe coupled to said injector and a rotary hit and miss damper at the inlet to said injector, said damper serving to control the passage of air through and past said injector.

In testimony whereof we have signed our names to this specification in the presence of two subscribing witnesses.

GEORGE KEITH.
DAVID BALFOUR BAIN.

Witnesses:
  ISABEL ROLLO,
  KATE FOTHERINGHAM.